Patented Aug. 5, 1924.

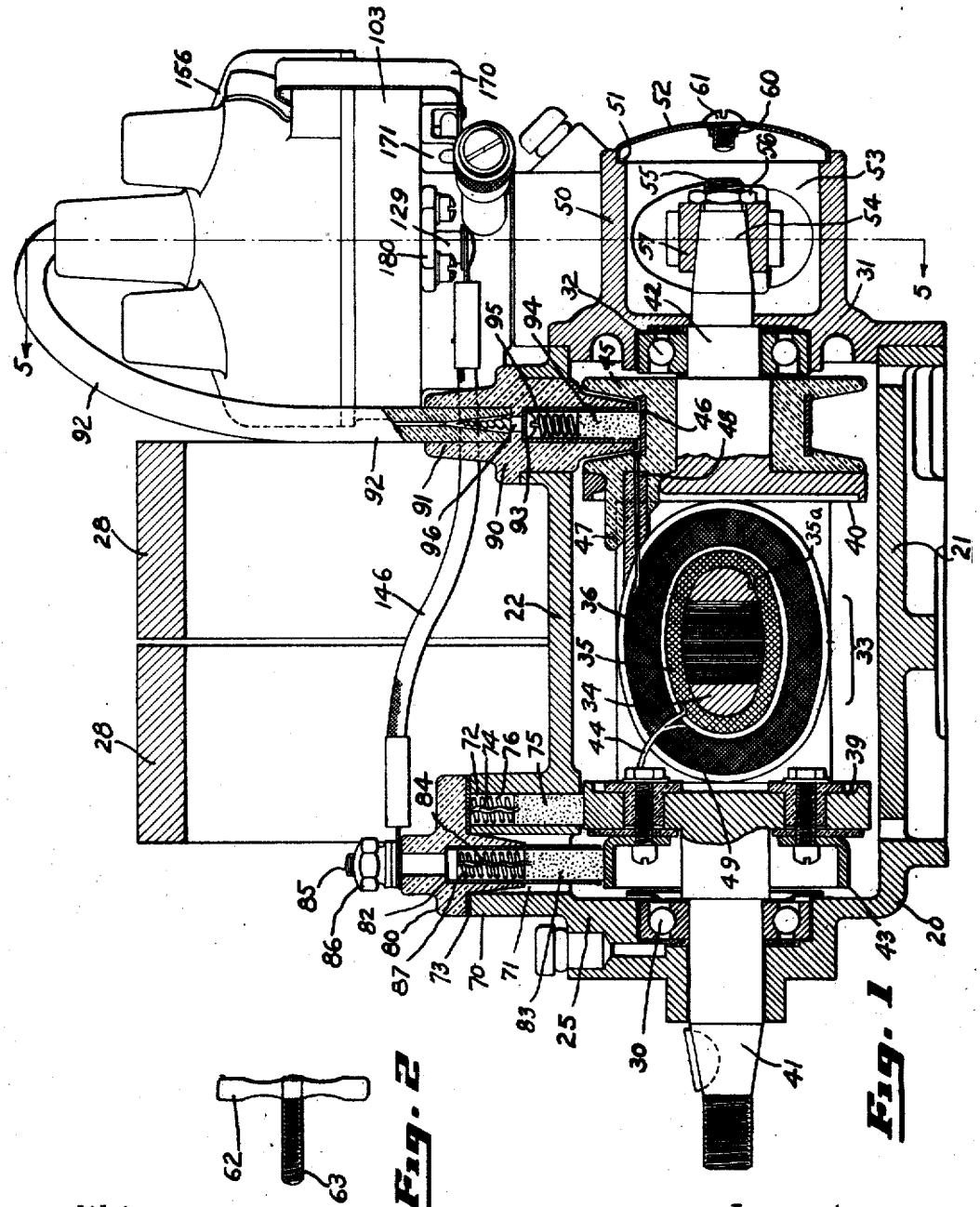

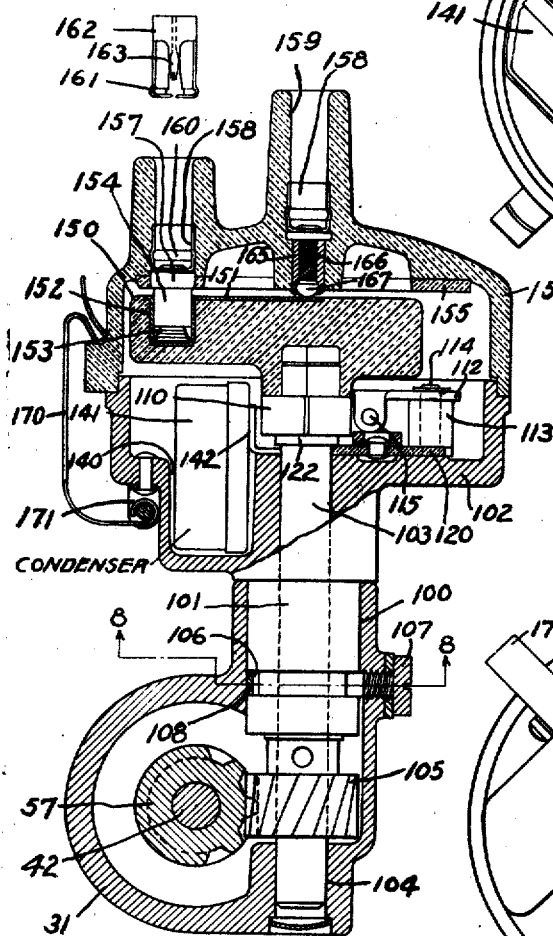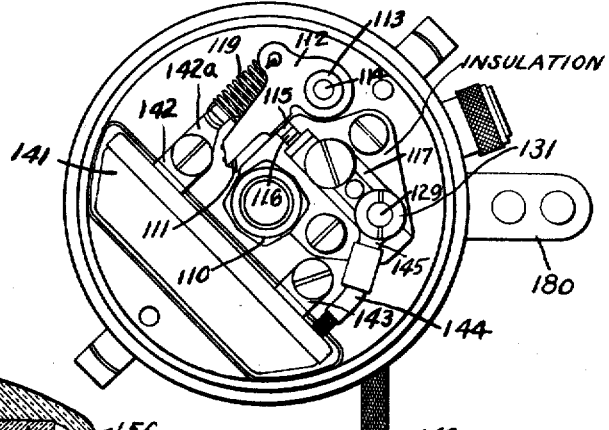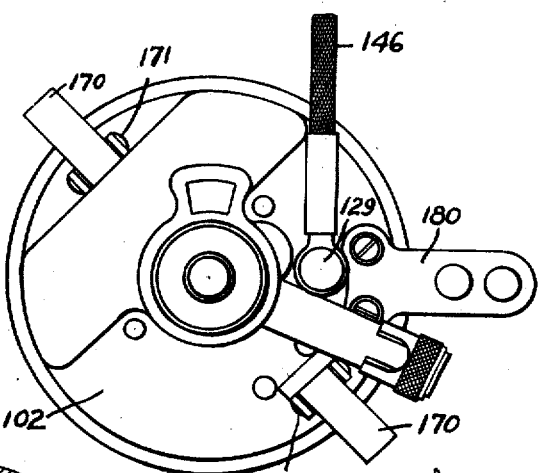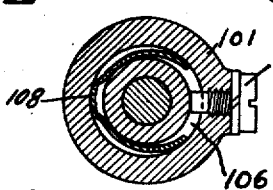

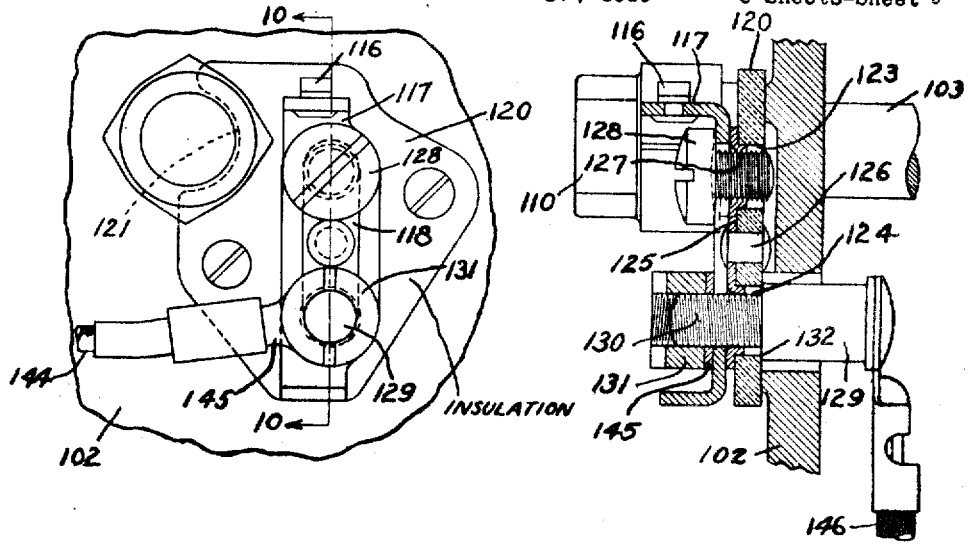

1,503,483

UNITED STATES PATENT OFFICE.

OLIVER F. CONKLIN AND JOHN A. VANNEMAN, OF ANDERSON, INDIANA, ASSIGNORS TO THE REMY ELECTRIC COMPANY, A CORPORATION OF INDIANA.

MAGNETO.

Application filed December 17, 1919. Serial No. 345,580.

*To all whom it may concern:*

Be it known that we, OLIVER F. CONKLIN and JOHN A. VANNEMAN, citizens of the United States of America, residing at Anderson, county of Madison, State of Indiana, have invented certain new and useful Improvements in Magnetos, of which the following is a full, clear, and exact description.

This invention relates to magnetos and has among its objects simplification of construction with a view to lessening the cost of manufacture.

It is a further object of the invention to construct and arrange the magneto interrupter and distributing apparatus of the magneto in such a manner as to be readily accessible for inspection and adjustment; and so that the apparatus may be removed as a unit from the magneto.

In carrying out the foregoing aim of the invention the timer cam is not mounted upon the magneto armature shaft, as is usually the construction, but a vertical shaft carrying the timer cam and the distributor rotor is mounted upon the magneto frame and is driven by means of suitable gearing from the armature shaft. In this connection it is a further object of the invention to provide for adjustments between the timer cam and the magneto armature shaft, but in such a manner that persons who are not familiar with the construction and operation of the magneto cannot easily tamper with these adjustments. One manner of carrying out this object is to mount the timer cam in a non-adjustable manner upon the cam shaft and to adjust the time relation between the timer cam shaft and the armature shaft by adjusting the gearing between these shafts. The aforesaid gearing is enclosed in a housing provided with a cover which cannot be easily removed except by such persons as service men who are equipped with the proper tools, and who thoroughly understand what adjustments are necessary to render the operation of the magneto effective.

It is a further object of the invention to provide improvements in the construction of the magneto interrupter in order to reduce to a minimum the wear existing between the operating parts.

Another object of the invention is to provide improvements in the mounting of the breaker lever of the magneto interrupter whereby this lever may be quickly detached for repair or replacement from the magneto interrupter.

A further object of the invention is to provide improved means for adjusting the interrupter or timer contacts.

A further object of the invention is to reduce to a minimum the resistance in the primary ignition circuit by insuring a good electrical contact between the stationary and movable parts of the magneto.

A further object is to provide improved means for mounting the condenser to facilitate replacement or repairs.

A further object is to provide improved means for mounting the conducting brushes of the magneto to facilitate removal for inspection or replacement.

Other and further objects of the present invention will be apparent from the following description, reference being had to the accompanying drawings, wherein a preferred embodiment of the present invention is clearly shown.

In the drawings:

Fig. 1 is a longitudinal sectional view of a magneto embodying the present invention;

Fig. 2 is a side elevation of a special tool used to remove the magneto end frame cover;

Fig. 5 is a sectional view of the magneto timer-distributor unit taken on the line 5—5 of Fig. 1;

Figure 3:
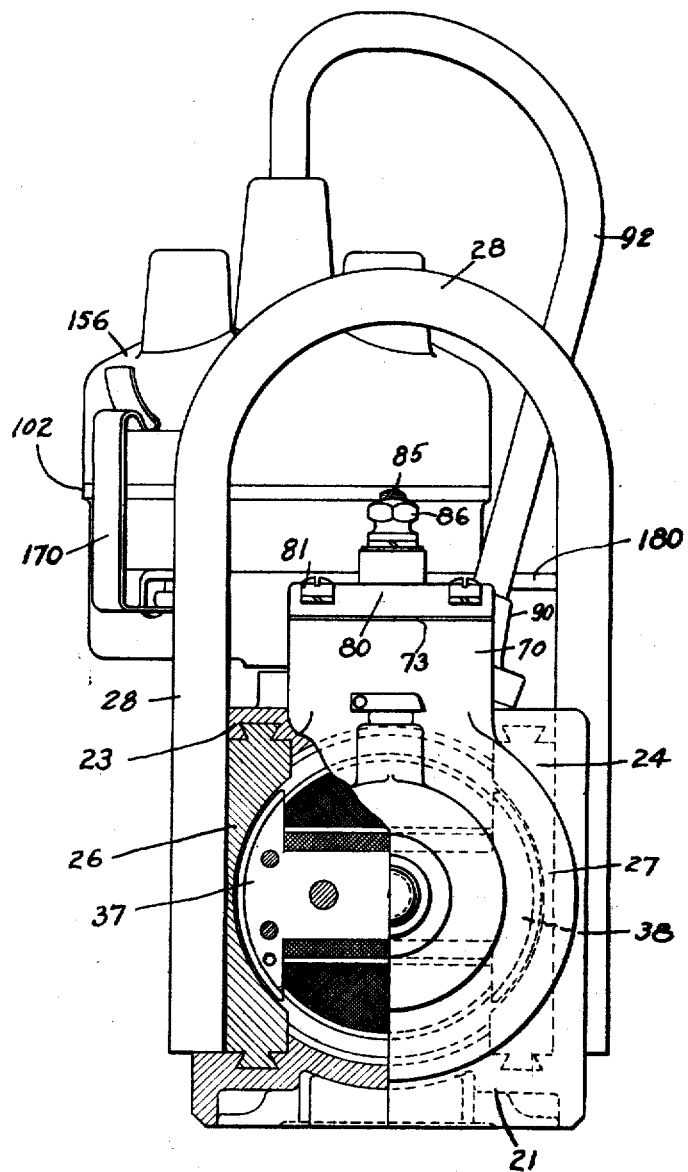
Fig. 3 is an end view of the magneto viewed from the left of Fig. 1, certain parts being shown in section.
Figure 4:
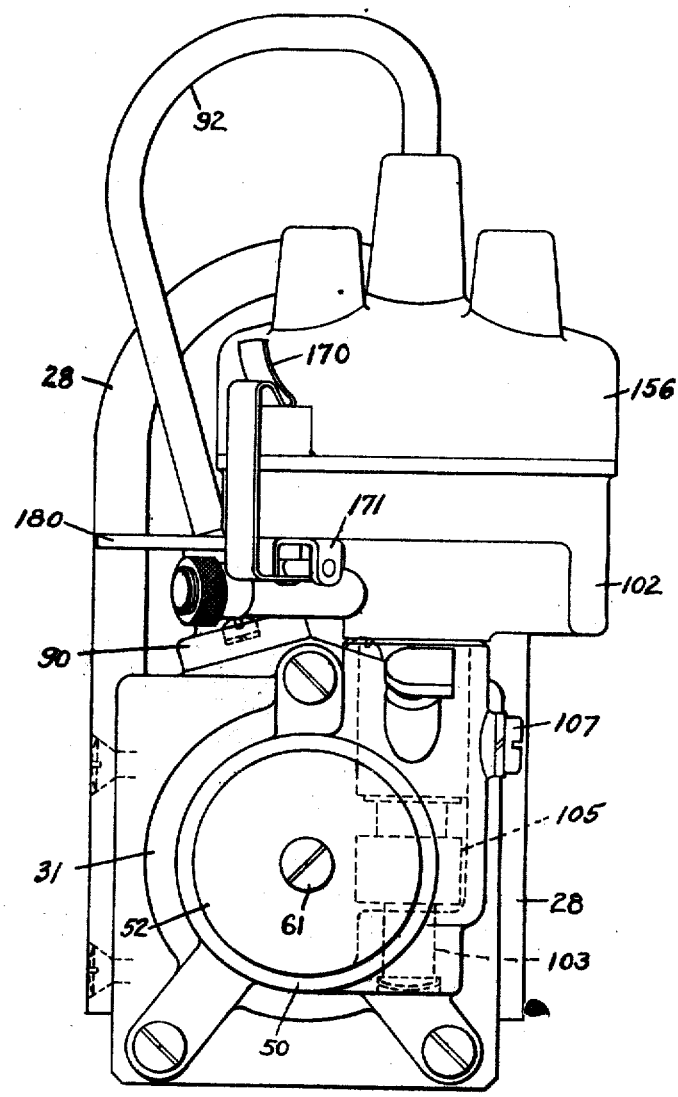
Fig. 4 is an end view of the magneto viewed from the right of Fig. 1.

Fig. 5ª is a side view of the high tension cable terminal clip;

Fig. 6 is a plan view of the timer with the distributing apparatus removed;

Fig. 7 is a bottom plan view of the timer frame when removed from the magneto end frame;

Fig. 8 is a sectional view taken on the line 8—8 of Fig. 5;

Fig. 9 is a fragmentary plan view of a portion of the timer; and

Fig. 10 is a sectional view taken on the line 10—10 of Fig. 9.

In the drawings, 20 designates the magneto armature housing comprising a bottom wall 21, a top wall 22, side walls 23 and 24 and an end wall 25. This housing 20 is constructed of non-magnetic material but the major portions of the side walls 23 and 24 are occupied by the magneto pole pieces 26 and 27 which are constructed of magnetizable material. Where the housing 20 is formed by means of the die-casting process, previously constructed pole pieces are located within the die-casting mold and the die metal is poured therearound. In the completed product the outer surfaces of the pole pieces 26 and 27 are substantially parallel and are flushed with the outer surfaces of the housing walls 23 and 24. The magneto permanent magnets 28 are secured in position upon the housing 20 by bolting them to the pole pieces 26 and 27.

The end wall 25 is provided with a bearing 30, and the open end of the housing 20 is provided with an end plate or frame 31 carrying a bearing 32. The housing 20 and its cover 31 form a substantially dust and moisture proof box for the magneto armature 33. Armature 33 comprises a core 34, primary winding 35 and secondary winding 36. The core 34 is provided with pole faces 37 and 38 against opposite ends of which are bolted the flanges 39 and 40 of the armature shaft sections 41 and 42, respectively. Shaft 41 is journalled upon bearing 30 and shaft 42, upon bearing 32.

Collector ring 43 is mounted upon flange 39 but insulated therefrom, and is connected with one terminal 44 of the primary winding 34, the other primary terminal 35ª being grounded upon the armature core 34. The flange 40 is provided with a deeply grooved ring 45 of insulating material having embedded therein a collector ring 46 of conducting material. The ring 45 is provided with an extension 47 which projects through an aperture in the flange 40. Extension 47 is apertured to provide for the projection therein of the heavily insulated terminal 48 of the secondary winding 36. The other terminal 49 of the secondary 36 is connected to the primary terminal 44.

The housing cover 31 is provided with an annular flange 50 the outer portion of which is provided with an annular groove 51. The end frame cover 52 snugly fits into this groove 51 in such a manner that it cannot be readily removed except by special means which will be described later. The end cover 31 together with its cover plate 52 form a substantially dust proof gear housing 53.

The shaft 42 projects into housing 53 and is provided with a tapered portion 54 and with a threaded portion 55 which cooperates with a nut 56. A spiral gear 57 having a tapered bore fits over the tapered portion 54. After this gear 57 has been adjusted in position the nut 56 is tightened in order to firmly secure gear 57 upon the shaft 42.

The cover plate 52 is provided with a threaded aperture 60 located opposite to the end of the shaft 42. Aperture 60 is normally closed by a short screw 61. When the screw 61 is removed, the tool 62, see Fig. 2, may be inserted. The threaded shank 63 of tool 62 is long enough so that by screwing the tool 62 through aperture 60 the end cover 52 is forced out of position and thus removed from the end frame 31 in order to provide access to the gearing within the housing 53. It will be apparent from the foregoing that the cover 52 has been mounted in such a manner that it cannot be readily removed except by persons provided with the proper tools.

The magneto housing upper wall 22 is provided with an upwardly extending boss 70 which is apertured at 71 and 72. A metallic plate 73 is directly mounted upon the boss 70 and has attached thereto a flexible conductor 74 attached at the other end to a carbon brush 75 which is constructed so as to have a sliding fit within the aperture 72. A spring 76 is interposed between the plate 73 and the brush 75 in order to maintain said brush 75 with yielding pressure against the cylindrical periphery of the flange 39. A plug of insulating material 80 and the plate 73 are secured in position upon the boss 70 by means of screws 81. Plug 80 is apertured to provide for the projection thereinto of a tube 82 in which is slidably mounted a brush 83. Brush 83 is attached to one end of a flexible conductor 84 the other end of which is attached to a bolt 85 having its threaded portion projecting outside of the plug 80 so as to engaged by a nut 86. A spring 87 is located between the brush 83 and the bolt 85 and serves to maintain brush 83 with yielding pressure against the collector ring 43.

The housing upper wall 22 is apertured also to receive a plug 90 of insulating material which is provided with a hollow sleeve portion 91 for the reception of an insulated stranded conductor 92. The plug 90 is provided with a conducting tube 93 in which is slidably mounted a brush 94 maintained in engagement with the collector ring 46 by means of a spring 95. A wood screw 96 projects through the tube 93 and into the sleeve portion 91. This screw 96 provides an electrical connection between the tube 93 and the cable 92 and serves to anchor said cable securely within the sleeve portion 91, and to provide a waterproof joint.

Referring more particularly to Fig. 5, the end frame 31 is provided with a bearing 100 within which is supported for rotation the downwardly projecting staff 101 of the cup-shaped timer frame 102. The staff 101 is apertured to provide a bearing for the timer cam shaft 103 the lower end of which is journalled in a second bearing 104 provided within the end frame 31. Shaft 103 carries a spiral gear 105 which is engaged by the gear 57 carried by the shaft 42. The staff 101 is provided with a groove 106 into which projects the end of a screw 107 having a threaded engagement with the frame 31. Said screw 107 prevents endwise movement of timer cup 102 while permitting rotation thereof. A conducting clip 108 of resilient material occupies a portion of the groove 106 and serves to insure a good electrical connection between the timer cup 102 and the magneto housing end plate 31 and the magneto housing 20.

The timer cam 110 is secured upon the cam shaft 103 in a non-adjustable fashion and said cam cooperates with an obliquely disposed rubbing block 111 mounted upon the end of breaker lever 112. Lever 112 is provided with a hub 113 which is journalled upon a stud 114 carried by the timer cup 102. Breaker lever 112 carries the movable timer contact 115 cooperating with stationary timer contact 116 which is carried by a contact adjusting plate 117. The adjusting plate is provided with a slot 118. A block 120 of non-conducting material is secured upon the timer cup 102. Block 120 is cut out as 121 to provide a semi-circular recess 121, so that said block 120 may fit around a portion of cam shaft 103 and may engage a shouldered portion 122 provided either upon the cam 110 or upon the shaft 103. In this manner the block 120 serves to locate the shaft 103 with respect to the shaft 42. Block 120 is provided with apertures 123 and 124 and is reinforced by a metallic plate 125 secured thereto by means of rivet 126. Plate 125 is provided with a threaded aperture 127 having engagement with a screw 128 which passes through the slot 118 provided in contact adjusting plate 117. Timer cup 102, block 120 and plate 125 are provided with aligned apertures to provide for the projection therethrough of a bolt 129 having a threaded portion 130 extending through slot 118 and engaged by a nut 131. The shouldered portion 132 of bolt 129 engages against the block 120, so that by tightening up the nut 130 the contact adjusting plate 117 may be secured in adjusted position upon the timer cup 102.

The timer cup 102 is provided with a downwardly projecting recess 140 in which is located a condenser box 141 which is supported upon the timer cup 102 by means of brackets 142 and 143. The condenser box 141 contains a condenser one end of which is grounded upon a box and consequently upon the timer cup 102, and the other end of which is attached by means of a conductor 144 to a terminal clip 145 which in turn is attached to the bolt 129 by means of the nut 131. A flexible conductor 146 is attached at one end to the bolt 129 and at the other to the bolt 85 (see Fig. 1).

A distributor rotor 150 of non-conducting material is mounted upon the cam 110 in a manner so as to be supported and driven thereby. Rotor 150 is provided with a conductor 151 having a cup-shaped portion 152 in which is located a spring 153 and a brush 154 which is maintained with yielding pressure by means of said spring 153 against the distributor track 155. Track 155 is preferably constructed of rubber which has been molded within the distributor head 156 which is constructed of bakelite or other phenol condensation product. The track 155 is provided with a plurality of metallic inserts or buttons 157, only one being shown. These buttons are attached to metallic receptacles 158 which are located within the cable receiving sleeve 159. Receptacle 158 is provided with an annular groove 160 which is arranged to be engaged by the flexible portions 161 of a cable terminal clip 162 shown at Fig. 5ª. This terminal clip 162 is provided with an inwardly projecting pointed hook portion 163 which pierces the insulation of the cable when the cable and the clip 162 are inserted within the cable receiving sockets 159. The receptacle 158 which is arranged axially of the shaft 103 is engaged by a spring 166 which presses against a button 167 carried by the sleeve 165 which is slidably mounted within the head 156. The cable 92 is attached to the receptacle 158 by means of one of the clips 162.

The distributor head 156 is maintained upon the timer cup 102 by means of spring clips 170 which are pivotally mounted upon brackets 171 riveted to the timer cup 102.

The bracket 142 which supports the condenser 131 is provided with a hook portion 142ª. A spring 119 is attached at one end to the hook 142ª and at the other end to the breaker lever 112. This spring 119 serves to maintain contacts 115 and 116 in engagement, and also to maintain said breaker lever in position upon the stud 114. After the distributor head 156 has been removed by disengaging the clips 170, the spring 119 may be disengaged from the hook 142ª, and the breaker lever 112 may be pulled off from the stud 114. In this manner the lever may be easily replaced by a new one or the contact 115 may be easily cleaned.

In order to adjust the timing of the ignition a timer lever 180 is secured upon the lower surface or outer surface of the timer cup 102. The conductor 136 and 92 being flexible, adjustments of the timer cup 102 can be made without interfering with the electrical connections.

The operation of the magneto is as follows: When the magneto armature is in the position shown in Fig. 3 the primary circuit is closed and comprises the following conducting elements. Primary winding 35, conductor 44, collector ring 43, brush 83, flexible wire 84, bolt 85, flexible conductor 146, bolt 126, contact adjusting plate 117, contact 116, contact 115, breaker lever 112, stud 114, timer cup 102, spring conducting clip 108, magneto housing 20, brush 75, flange 39, core 34 and primary terminal 36 to primary 35. The permanent magnets and the armature core will operate in such a manner as to cause a current to be built up in the primary circuit during a portion of the rotative movement of the armature 33. At a time when there is a tendency for reversal of flux through the armature core but the primary current is tending to oppose this flux change, the primary circuit will be broken by the separation of the contacts 115 and 116 which is brought about by the action of the timer cam 110 upon the rubbing block 111. At this instant a sparking impulse will be induced in the secondary winding 36 and will be conducted by means of terminal 48, collector ring 46, brush 94, cable 92, receptacle 158, butte 167, conductor 151 to rotor brush 154. The distributing rotor 150 is located so that, at the instant referred to, this brush 154 will be in engagement with one of the stationary contacts 157. From the stationary contact 157 this sparking impulse will be conducted by means of a high tension cable to one of the spark plugs of an engine, (not shown) where sparking will occur. The secondary circuit will be completed through the engine frame, the magneto frame 20 which is arranged to be mounted upon the engine, bearings 30 and 32, shafts 41 and 42, armature core 34 primary winding 35 and secondary terminal 49.

From the foregoing description it is evident that the construction of a high tension magneto has been simplified by reducing the number of parts. This is accomplished by assigning more than one function to certain elements. For instance, the magneto housing end frame 31 serves to form a dust proof enclosure to support one of the armature shaft bearings and to provide a gear housing. The flange 39 serves not only as an element by which shaft section 41 and armature core 34 are connected, but also as a collector ring forming a part of the primary circuit. The same bolts 81 which secure the plug 80 in position serve to secure in position the plate 73 which carries one of the primary circuit brushes 75. In the timer one bolt 129 and one nut 131 provide electrical connections between the condenser 141, the cable 146 and the stationary timer contact 116, and serve also as a means for securing the contact adjusting plate 117 in position.

Another important feature of the invention to which reference has been made is that of providing means by which the timer can be adjusted in relation to the operation of the engine for which the magneto is provided, but that after these adjustments have once been made by skilled persons the magneto can be closed up in such a manner that these adjustments cannot be tampered with by unskilled or meddlesome persons. This is accomplished by securing the timer cam upon the timer shaft in a non-adjustable manner instead of in an adjustable one as is the usual practice. The adjustment of the timer cam is secured by means of adjusting the gearing between the timer cam shaft and the magneto armature shaft. This gearing is located within an enclosure which is sealed up in such a fashion that it cannot be readily opened except by persons having special tools for the purpose. This feature of the invention is important since a number of troubles which are credited to the magneto often arise from faulty adjustments of the timer made usually by unskilled mechanics.

Another feature of the invention consists in providing a unitary timer and distributor struction which can be removed bodily from the rest of the magneto structure without requiring the removal of the magneto from position on the engine frame. This is advantageous when it is desired to remove the unit for repairs, or for replacement by another unit. The timer and distributor unit is so located that the distributor head can be easily removed, while the magneto is still in assembled position on the engine frame, permitting inspection of the parts enclosed within the timer cup. Such parts as the condenser, breaker lever and stationary contacts may easily be removed for repair or replacement, and the breaker contacts may be easily cleaned.

In case of wear, the non-conducting block 120, which supports the stationary contact and fits in under the cam 110, can easily be replaced so that the gears 105 and 57 will be maintained in proper adjustment and the cam 110 will be maintained at the proper elevation with respect to the rubbing block 111.

It is to be noted also that the conducting brushes in the magneto low- and high-tension circuits are arranged so as to be readily accessible from the top of the magneto.

While the form of mechanism herein shown and described constitutes a preferred form of embodiment of the invention, it is to be understood that other forms might be adopted, all coming within the scope of the claims which follow.

What I claim is as follows:

1. In a magneto, the combination with field magnets and an armature; of a magneto frame of conducting material supporting said magnets and armature; collector rings supported by said armature and connected with the windings thereof; collector brushes; a conducting member in contact with the frame and attached to one of the brushes; a non-conducting member supporting the other brush upon the frame; and common securing provisions for both said means.

2. In a magneto, the combination with field magnets and an armature; of a magnet frame of conducting material supporting said magnets and armature; collector rings supported by the armature; collector brushes; a conducting member connected with one brush and resting on the frame; a non-conducting member resting on said conducting member and attached to another brush; and common means for securing said members to the frame.

3. In a magneto, the combination with field magnets and pole pieces; of a magneto frame supporting the magnets and pole pieces; shaft provisions carrying an armature mounted for rotation upon said frame; a timer housing support attached to the magneto frame; a timer housing rotatably mounted on said support; cooperating contacts mounted within the timer housing, one of said contacts being grounded on the timer housing; conducting means insulated from the frame for connecting the ungrounded contact with the armature winding; means for grounding the armature winding on the magneto frame; and a resilient grounding member located between the timer housing and the timer support.

4. In a magneto, the combination with a frame and a field magnet supported thereon; of an armature; an armature shaft rotatably supported by said frame and projecting outside an end thereof; a gear adjustably mounted on the projecting end of said shaft; a timer including an operating shaft; a gear on said timer shaft cooperating with the first gear; a gear housing enclosing the gears and extending beyond the end of said armature shaft and provided with an opening opposite the end of said armature shaft; a cover fitting into said opening and provided with a screw-threaded orifice in line with said armature shaft; and a removable plug for said orifice.

5. In a magneto, the combination with a frame and a field magnet supported thereon; of an armature; an armature shaft rotatably supported by said frame and projecting outside an end thereof; a gear adjustably mounted on the projecting end of said shaft; a timer including an operating shaft; a gear on said timer shaft cooperating with the first gear; a gear housing mounted on said frame, carrying a bearing for said armature shaft, a support for said timer and providing an enclosure for said gears extending beyond the end of said armature shaft to provide an annular flange; a gear housing cover fitting within said annular flange and provided with a screw-threaded orifice in line with said armature shaft; and a removable plug for said orifice.

6. In a magneto, the combination with field magnets and an armature; of a supporting frame for the magnets and armature, said frame including a gear housing having an opening; a shaft extending into said housing; a gear adjustably mounted on said shaft; a cover for said housing opening, the periphery of the cover having a drive fit within said housing to render difficult the prying of the cover loose, said cover having a threaded aperture; and a removable closure for said aperture.

7. In a magneto, the combination with an armature having a shaft and a timer having a shaft; of cooperating gears connecting said shafts, one of said gears being adjustably mounted on one of the shafts; a housing enclosing said gears and having an opening; a cover for said housing opening, the periphery of the cover having a drive fit within the housing to render difficult the prying of the cover loose, said cover having a threaded aperture; and a removable closure for said aperture.

In testimony whereof we affix our signatures.

OLIVER F. CONKLIN.
JOHN A. VANNEMAN.

Witnesses:
F. J. HARDMAN,
FERN HAHN.